(12) United States Patent
Littlefield et al.

(10) Patent No.: US 9,215,136 B2
(45) Date of Patent: Dec. 15, 2015

(54) AGGREGATED DELIVERY OF TUNNEL FAULT MESSAGES ON COMMON ETHERNET SEGMENTS

(71) Applicant: Cisco Technology, Inc., San Jose, CA (US)

(72) Inventors: Joshua B. Littlefield, Wellesley, MA (US); Sukrit Dasgupta, Norwood, MA (US); Hari Rakotoranto, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 190 days.

(21) Appl. No.: 13/928,852

(22) Filed: Jun. 27, 2013

(65) Prior Publication Data

US 2015/0006946 A1    Jan. 1, 2015

(51) Int. Cl.
*H04L 12/24* (2006.01)

(52) U.S. Cl.
CPC .................................. *H04L 41/0686* (2013.01)

(58) Field of Classification Search
CPC . H04L 41/0686; H04L 41/0654; H04L 41/06; H04L 41/0677; H04L 12/4633; H04L 45/00; H04L 45/28; H04L 45/22; H04L 43/10; H04L 43/0823; H04L 63/123
See application file for complete search history.

(56) References Cited

U.S. PATENT DOCUMENTS

| | | | |
|---|---|---|---|
| 7,936,667 B2 | 5/2011 | Savage et al. | |
| 8,531,976 B2 | 9/2013 | Vasseur et al. | |
| 8,705,346 B2 * | 4/2014 | Wang et al. | 370/217 |
| 8,787,150 B2 * | 7/2014 | Fiorone et al. | 370/217 |
| 2006/0168241 A1 * | 7/2006 | Puthiyandyil et al. | 709/227 |
| 2008/0285466 A1 * | 11/2008 | Salam et al. | 370/241.1 |
| 2010/0002578 A1 * | 1/2010 | Fiorone et al. | 370/228 |
| 2010/0260041 A1 * | 10/2010 | Yan et al. | 370/225 |
| 2011/0280121 A1 * | 11/2011 | Boutros et al. | 370/221 |
| 2012/0082073 A1 | 4/2012 | Andreasen et al. | |
| 2012/0082093 A1 | 4/2012 | Andreasen et al. | |
| 2012/0082094 A1 | 4/2012 | Andreasen et al. | |
| 2012/0082146 A1 | 4/2012 | Andreasen et al. | |
| 2012/0082161 A1 | 4/2012 | Leung et al. | |
| 2014/0241144 A1 * | 8/2014 | Kashyap | 370/216 |

* cited by examiner

*Primary Examiner* — Nadeem Iqbal
(74) *Attorney, Agent, or Firm* — Parker Ibrahim & Berg LLC; James M. Behmke; Stephen D. LeBarron (57) ABSTRACT

In one embodiment, a device in a computer network determines one or more tunnels affected by a downstream fault in the computer network, and determines one or more common Ethernet segments of the device used by the affected tunnels. As such, the device generates, for each of the one or more common Ethernet segments, a respective fault message aggregating tunnel information of each of one or more particular affected tunnels on the corresponding common Ethernet segment, and sends each respective fault message with aggregated tunnel information over a selected tunnel of the one or more particular affected tunnels on the corresponding common Ethernet segment.

21 Claims, 6 Drawing Sheets

AGGREGATED DELIVERY OF TUNNEL FAULT MESSAGES ON COMMON ETHERNET SEGMENTS

TECHNICAL FIELD

The present disclosure relates generally to computer networks, and, more particularly, to tunnel fault messages.

BACKGROUND

Tunnels have been used for a number of applications such as the support of virtual private networks (VPNs) or Traffic Engineering following source routed paths hop-by-hop. Among the number of tunneling techniques developed over the past decade, multiprotocol label switching (MPLS) transport profile (TP) is a connection oriented packet switching oriented technology for transport networks. Generally, in the event of a failure of an MPLS-TP tunnel (label-switched path, "LSP"), the two routers adjacent to the point of failure generate Fault messages (an Operations, Administration, and Management, or "OAM" message) that are directed towards the two endpoints. These messages give information about the point of failure to the two endpoints. If multiple LSPs are traversing the faulty link, a Fault message is conventionally generated for every LSP in both directions. This model starts to incur significant time delay when the number of LSPs start to increase.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a computer network determines one or more tunnels affected by a downstream fault in the computer network, and determines one or more common Ethernet segments of the device used by the affected tunnels. As such, the device generates, for each of the one or more common Ethernet segments, a respective fault message aggregating tunnel information of each of one or more particular affected tunnels on the corresponding common Ethernet segment, and sends each respective fault message with aggregated tunnel information over a selected tunnel of the one or more particular affected tunnels on the corresponding common Ethernet segment.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR. In the case of areas rather than ASes since the routers are under a common authority, a single router may in fact serve as an exit border router of one area and an entry border router of another area.

Figure 1:
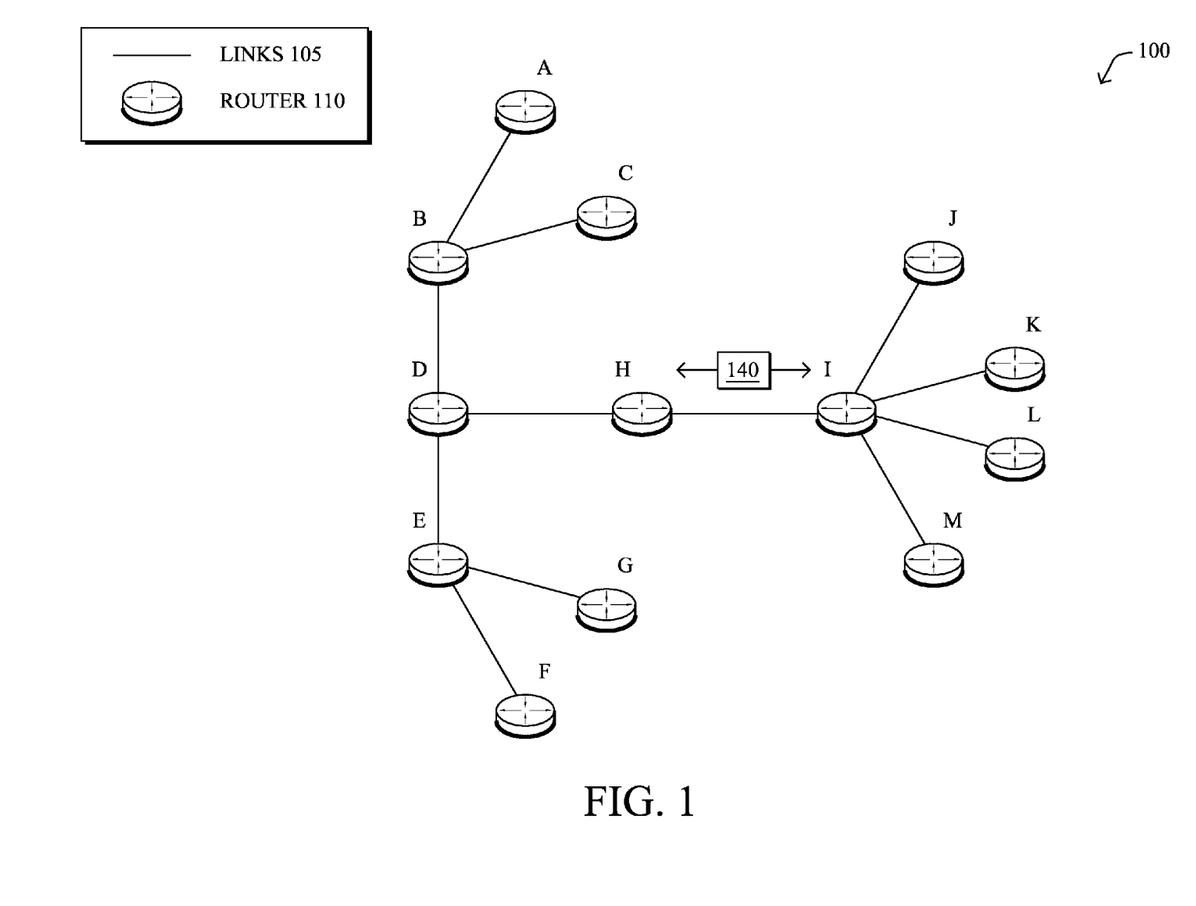
FIG. 1 illustrates an example computer network.

FIG. 1 is a schematic block diagram of an example computer network 100 illustratively comprising nodes/devices 200 (e.g., labeled as shown, "A" through "M", and described in FIG. 2 below) interconnected by various methods of communication. For instance, the links 105 may be wired links or shared media (e.g., wireless links, power-line communication or "PLC" links, etc.) where certain devices 200, such as, e.g., routers, computers, etc., may be in communication with other devices 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets 140 (e.g., discrete frames or packets of data) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other.

Figure 2:
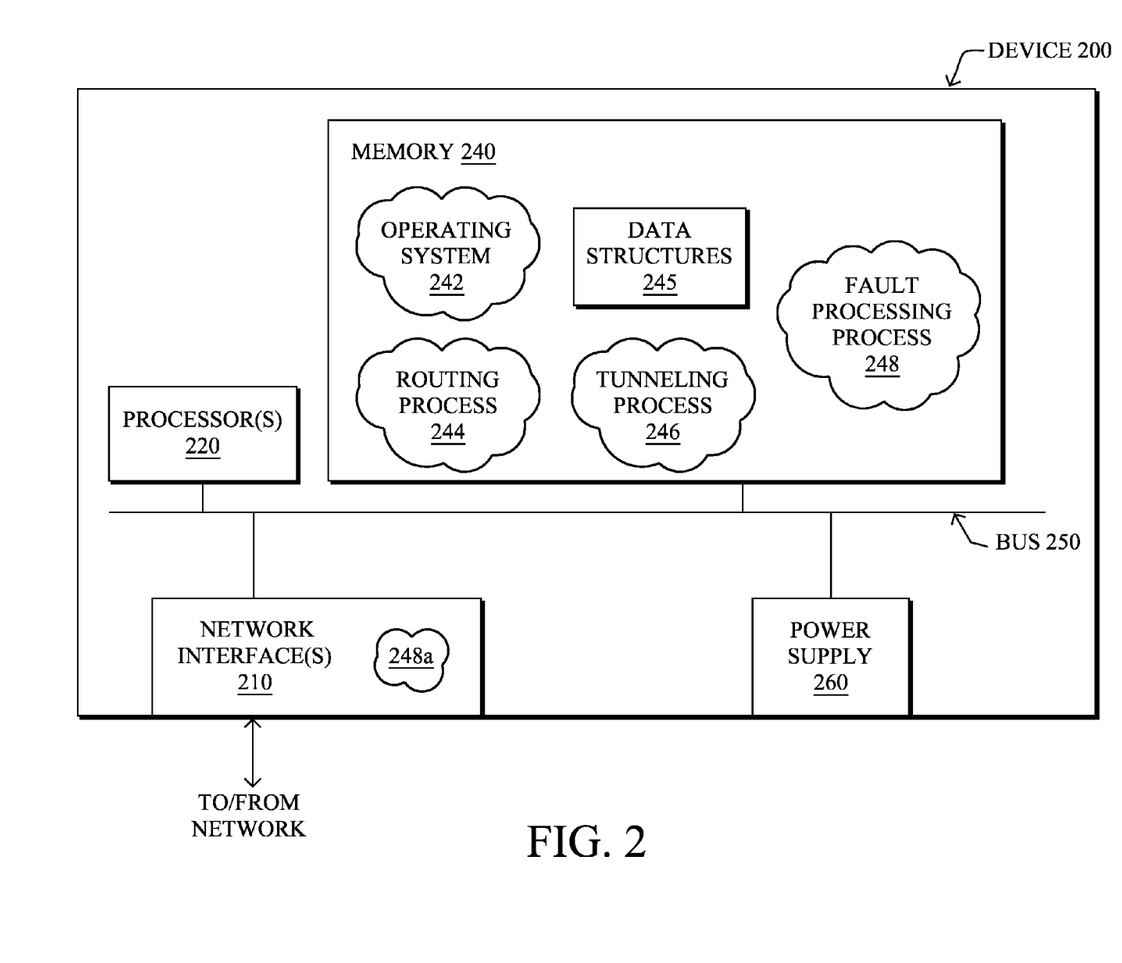
FIG. 2 illustrates an example network device/node.

FIG. 2 is a schematic block diagram of an example node/device 200 that may be used with one or more embodiments described herein, e.g., as any of the devices shown in FIG. 1 above (e.g., routers). The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply. Further, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases/link state databases (LSDBs)/Traffic Engineering databases (TEDs) and or tables. An operating system 242, portions of which are typically resident in memory 240 and executed by the processor, functionally organizes the device by, among other things, invoking operations in support of software processes and/or services executing on the device. These software processes and/or services may comprise routing process/services 244, tunneling process/services 246, and an illustrative fault processing process 248, as described herein. Note that while the processes are shown in centralized memory 240, alternative embodiments provide for certain aspects of the techniques herein to be specifically operated within the network interfaces 210 (e.g., "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables (data structures 245) containing, e.g., data used to make routing and forwarding decisions. Notably, routing services 244 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 244, for example, IGP services such as the conventional OSPF and IS-IS link-state protocols. Suppose, for example, that a communication link fails or a cost value associated with a network node changes. Once the change in the network's state is detected by one of the routers, that router may flood an IGP (or BGP) advertisement (message/packet 140) communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (data structure 245) stores the FEC, the next-hop information for the LSP, and the label required by the next hop.

Also, MPLS Traffic Engineering (TE) has been developed to meet data networking requirements such as guaranteed available bandwidth or fast reroute (FRR). MPLS TE exploits modern label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, among others, the Layer Two Tunnel Protocol (L2TP), the Point-to-Point Tunneling Protocol (PPTP), IP tunnels, and generic routing encapsulation (GRE) tunnels. In particular, establishment of a tunnel requires computation of a path between a head-end node (LSR) to a tail-end node, signaling along the path (e.g., through resource reservation protocol (RSVP)), and modification of forwarding tables at intermediate nodes (LSRs) along the path.

As noted above, MPLS transport profile (TP) is a connection oriented packet switching oriented technology for transport networks. MPLS-TP Tunnels are bidirectional and consist of two point-to-point static LSPs that can be co-routed. These LSPs are called the Working and the Protect LSPs. The LSP carrying traffic is called the Active LSP and the one protecting it is called the Protect LSP. Resiliency of traffic flow is obtained using a 1:1 LSP protection mechanism where failures/faults are detected on the Active LSP, for example, using connectivity verification protocol timeouts (e.g., bidirectional forwarding detection, "BFD") or Fault messages.

In the event of a failure, cutover of traffic takes place from the Active to the Protect LSP. The ideal situation is to have the smallest cutover time so as to reduce traffic disruption. The two routers adjacent to the point of failure generate Fault messages (Operations, Administration, and Management, "OAM" messages) that are directed towards the two endpoints. These messages give information about the point of failure to the two endpoints. If multiple LSPs are traversing the faulty link, a Fault-OAM message is conventionally generated for every LSP in both directions. This model starts to incur significant time delay when the number of LSPs start to increase.

Aggregating Tunnel Fault Messages

The techniques herein intelligently determine common ethernet segments shared by traversing tunnels (e.g., MPLS-TP LSPs) that have been affected by a link failure and then use one of the tunnels to transmit only one Fault-message populated to bundle information representing all the tunnels that are affected. In particular, the techniques herein provide a mechanism by which Fault messages can be bundled across common Ethernet segments to expedite delivery and speed up notification and potentially reduce cutover time, that is, reducing the total time fault messages take to originate from the point of failure and reach the endpoint where decisions based on it can be taken. This will also reduce traffic arising out of sending Fault-OAM messages individually on every LSP as well as reduce total processing and transmission time of all the messages at all the hops.

Specifically, according to one or more embodiments of the disclosure as described in detail below, a device in a computer network determines one or more tunnels affected by a downstream fault in the computer network, and determines one or more common Ethernet segments of the device used by the affected tunnels. As such, the device generates, for each of the one or more common Ethernet segments, a respective fault message aggregating tunnel information of each of one or more particular affected tunnels on the corresponding common Ethernet segment, and sends each respective fault message with aggregated tunnel information over a selected tunnel of the one or more particular affected tunnels on the corresponding common Ethernet segment.

Illustratively, the techniques described herein may be performed by hardware, software, and/or firmware, such as in accordance with the fault processing process 248, which may contain computer executable instructions executed by the processor 220 (or independent processor of interfaces 210) to perform functions relating to the techniques described herein, e.g., in conjunction with tunneling process 246. For example, the techniques herein may be treated as extensions to conventional protocols, such as MPLS-TP protocols, and as such, may be processed by similar components understood in the art that execute those protocols, accordingly.

Figure 3:
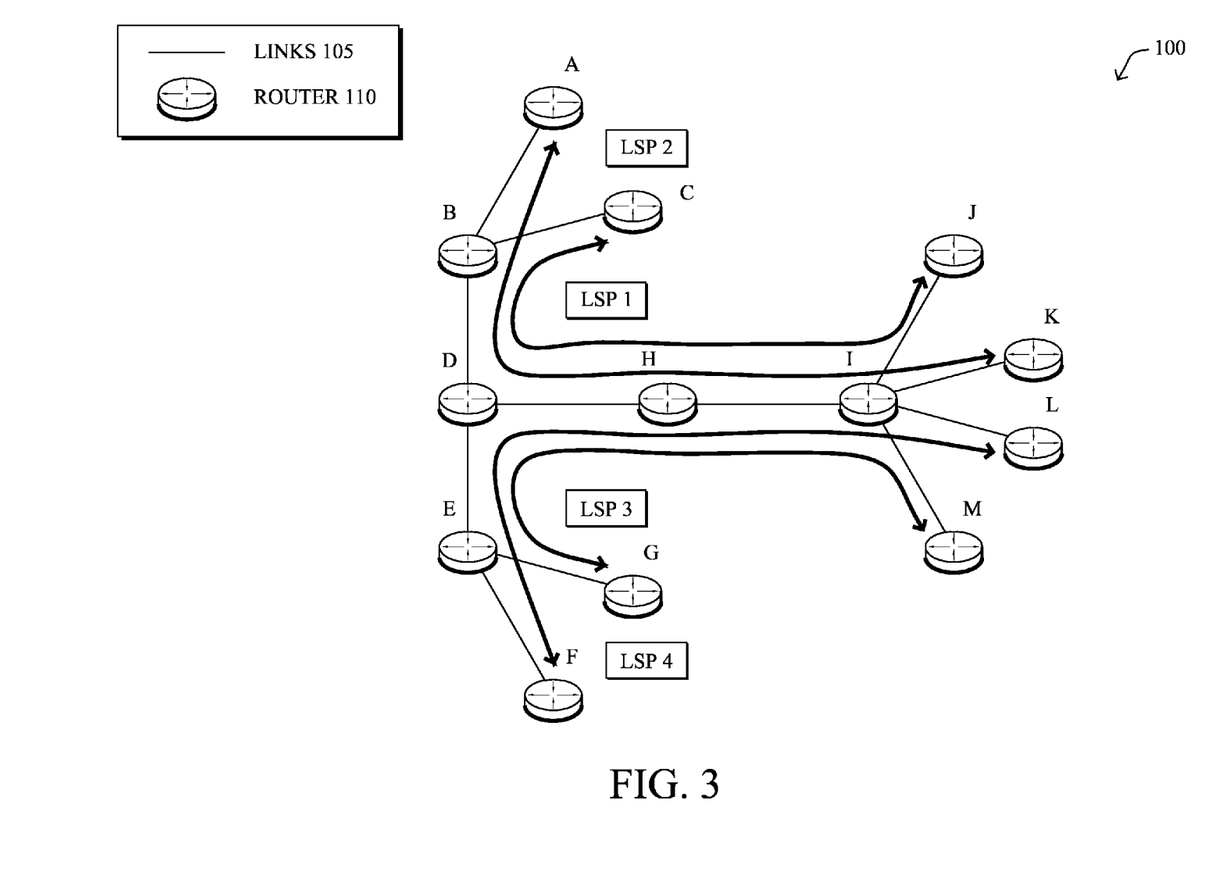
FIG. 3 illustrates an example of tunnels in the computer network.

FIG. 3 illustrates an example of tunnels (e.g., LSPs) within the network 100. For instance, LSP 1, LSP 2, LSP 3, and LSP 4 may traverse the links between various endpoints as shown. Currently, when a link with a tunnel (e.g., MPLS-TP) enabled goes down (administratively or otherwise), the routers on two ends of the failed/faulted link generate Fault messages for every MPLS-TP LSP that is traversing it and send it upstream towards the endpoints. Example fault messages comprise a link down indication (LDI), a lock report (LKR), an alarm indication signal (AIS), a remote defect indication (RDI), etc.

Figure 4:
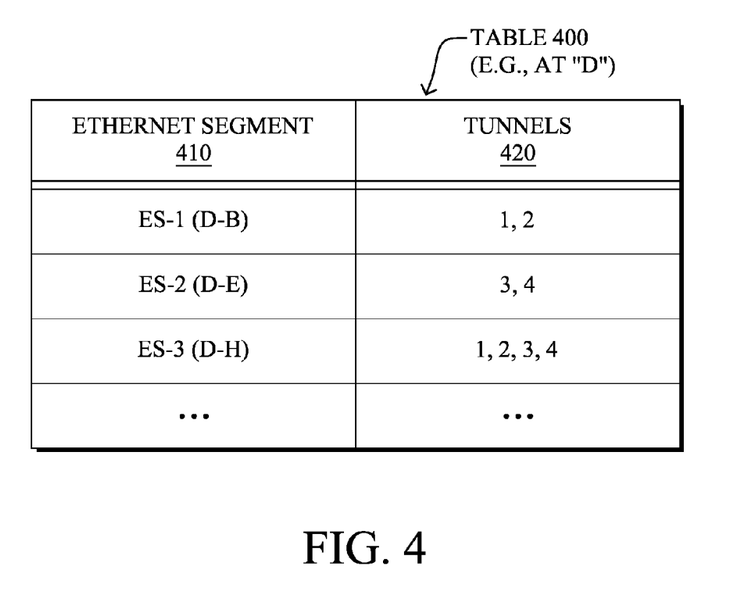
FIG. 4 illustrates an example common Ethernet segment table.

Operationally, according to the techniques herein, devices in the network may first determine the common ethernet segment used by the affected tunnels. For example, starting from a point of failure, this determination may be performed at every hop upstream until the endpoint is reached, where the determination starts with the routers adjacent to the link failure determining which tunnels are affected by it in response to the failure/fault. Alternatively, determining the common Ethernet segment used by the affected tunnels may be performed in advance of the tunnels being affected. For instance, FIG. 4 illustrates an example table 400 that shows a mapping between Ethernet segments 410 and corresponding tunnels 420 (e.g., showing those of device "D"). This table/list (e.g., a data structure 245), which maps all in-labels to their corresponding incoming interface, may be used to determine the common Ethernet segment of particular tunnels, which may be cross-referenced against a list of incoming affected tunnels (e.g., if receiving notice that tunnels 1, 2, and 3 have fault condition, the table may be used to determine that tunnels 1 and 2 share ES-1, while tunnel 3 does not share any common Ethernet segment with another affected tunnel, as tunnel 4 is not affected in this example). Notably, the size of the table will generally be as large as the number of tunnels that are traversing the device, but not any larger.

Figure 5:
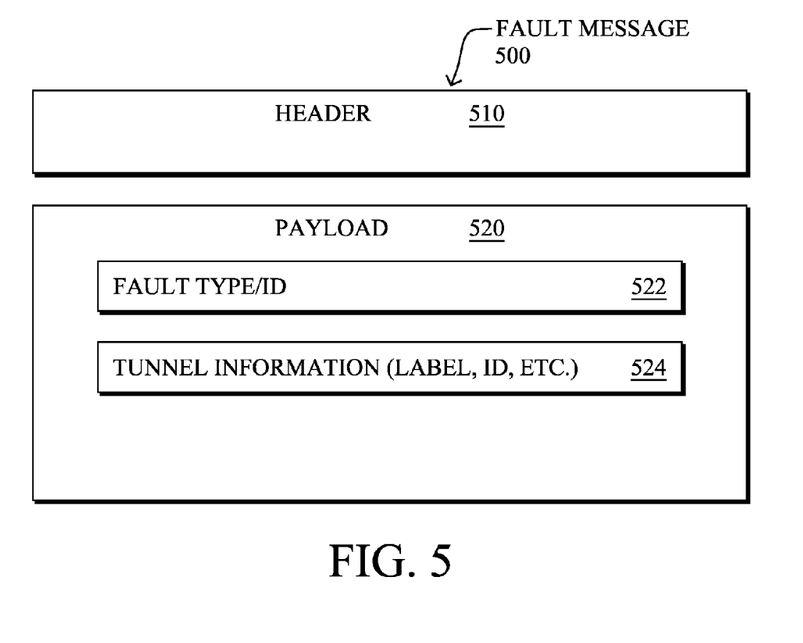
FIG. 5 illustrates an example fault message.

As a second aspect of the techniques herein, one dynamic Fault message is generated (only one) for every Ethernet segment that carries affected tunnels. For instance, FIG. 5 illustrates a simplified fault message 500 having a generic header 510 and payload 520, which may comprise information (e.g., as type-length-value or "TLV" fields) such as a fault type/ID 522, and a tunnel information field 524, as described herein.

Figure 6:
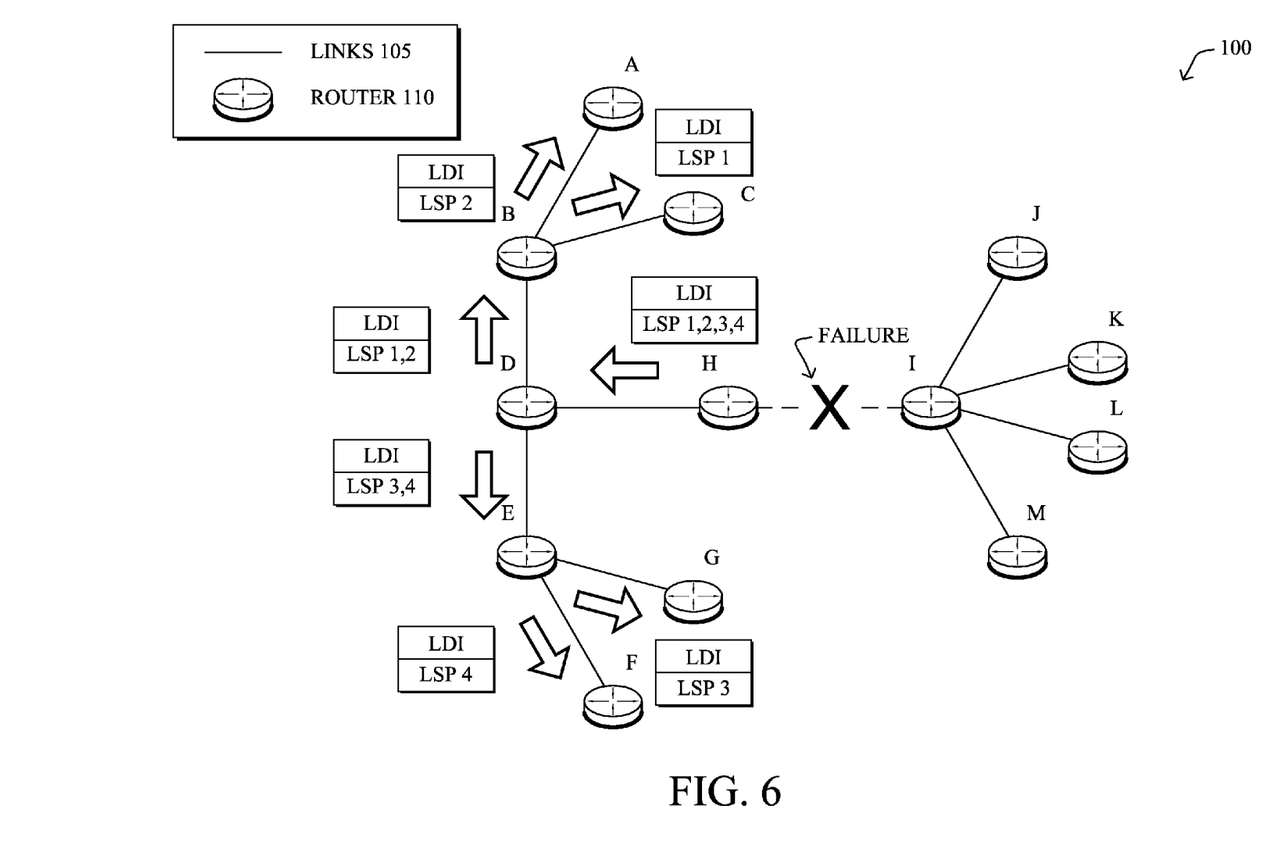
FIG. 6 illustrates an example transmission of aggregated fault messages.

Illustratively, assume as shown in FIG. 6 that a failure/fault occurs between devices H and I, and fault messages are to be generated (shown only in one direction, though fault messages may be sent in both directions, i.e., to devices J through M). According to the techniques herein, after the determination step above, each hop generates only one Fault message to be sent over any one of the affected tunnels per unique Ethernet segment. Notably, the difference herein from standard operation is that in this newly designed Fault message, tunnel information 524 (e.g., tunnel out-labels, tunnel IDs, etc.) related to the carrying tunnel and all the other affected tunnels traversing the same ethernet segment will also be carried in the tunnel information TLV 524 of the fault message.

For instance, as shown in FIG. 6, device H sends a single fault message to device D comprising information that an LDI has occurred, and affects LSPs 1, 2, 3, and 4. Node D receives this message, and determines that from the affected LSPs 1-4, LSPs 1 and 2 share an Ethernet segment to device B, and LSPs 3 and 4 share an Ethernet segment to device E. Device B and device E then receive the fault message, and perform the same process to divide the fault message toward respective endpoints, accordingly. In this manner, this LDI packet, with its populated tunnel information 524, reaches each upstream hop, where the determination phase occurs again and common upstream Ethernet segments for affected tunnels are determined and Fault messages generated accordingly. This continues at every hop till the Fault message reaches the endpoints.

According to the techniques herein, therefore, the devices determine the incoming links for the tunnels and generates one summarized fault packet per incoming link for all the affected tunnels traversing that link. Numerically, for example, if there are five incoming links carrying the 1000 tunnels, five summarized fault packets will be generated, one each for an outgoing link. This behavior will be repeated for all subsequent upstream/downstream hops where the mechanism is enabled. It should be noted that at every hop two things may happen:

1. Multiple fault messages could be generated, one for every common set of tunnels that are traversing the same upstream ethernet segment; and
2. The size of the tunnel information field 524 could reduce because tunnels may start to diverge towards non-common head-ends.

Notably, fault processing (e.g., LDI) relies on fast delivery, so any hop-by-hop examination may affect such delivery. Accordingly, the techniques herein can be configurable, such that they is only performed on links which are being used by a high scale number of tunnels (above a threshold). As such, the techniques herein can be selectively enabled to generate one fault message for the common segment where particularly beneficial (e.g., provider core routers) instead of having the number of fault messages being equivalent to the number of tunnels traversing the link.

Figure 7:
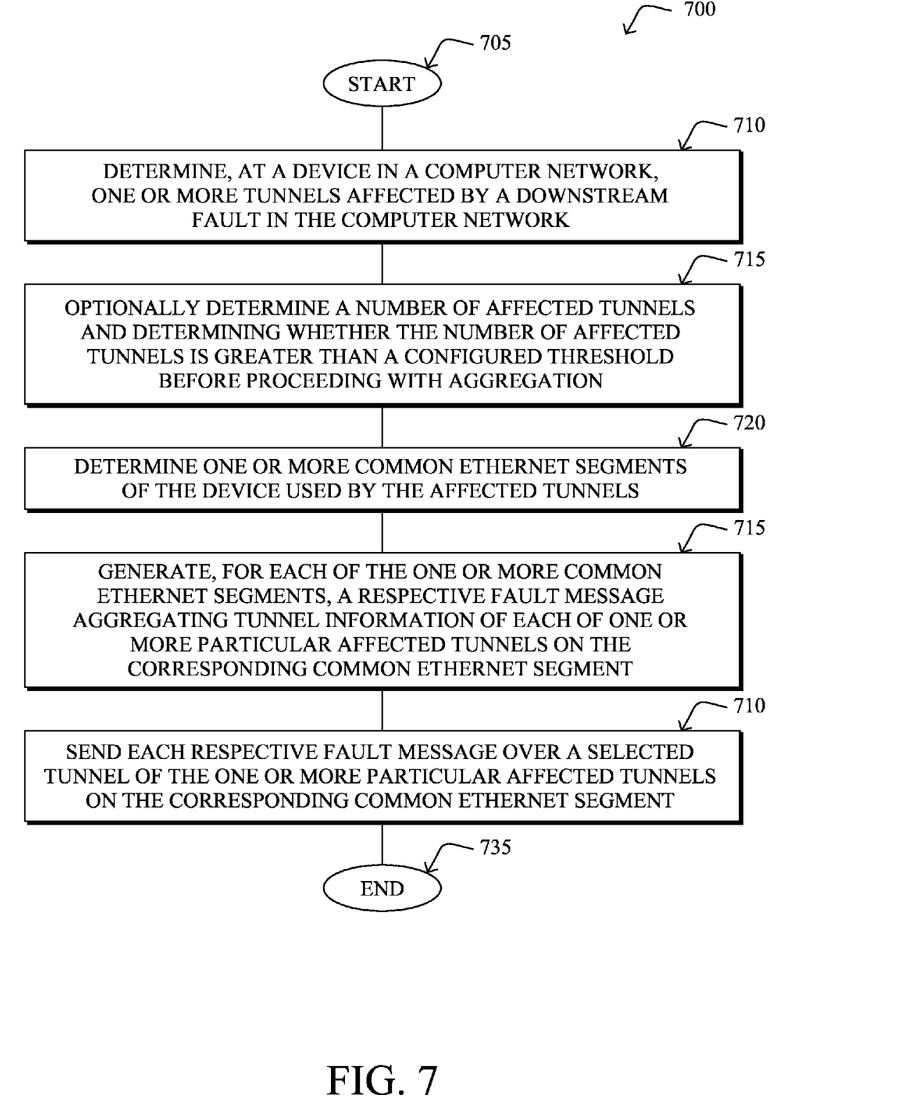
FIG. 7 illustrates an example simplified procedure for aggregated delivery of tunnel fault messages on common Ethernet segments in a computer network.

FIG. 7 illustrates an example simplified procedure 700 for aggregated delivery of tunnel fault messages on common Ethernet segments in a computer network in accordance with one or more embodiments described herein. The procedure 700 may start at step 705, and continues to step 710, where, as described in greater detail above, a device determines one or more tunnels (e.g., MPLS-TP-LSPs) affected by a downstream fault in the computer network, such as by detecting a fault of an attached Ethernet segment or receiving an incoming fault message from a downstream device (aggregating tunnel information identifying the affected tunnels), as described above. Optionally, in step 715, the device may determine a number of affected tunnels and determining whether the number of affected tunnels is greater than a configured threshold before proceeding with aggregation (that is, aggregating the tunnel information within respective fault messages below only in response to the number of affected tunnels being greater than the configured threshold). Assuming the device is proceeding, then in step 720 the device determines one or more common Ethernet segments of the device used by the affected tunnels, and in step 725 generates, for each of the one or more common Ethernet segments, a respective fault message (e.g., LDI, LKR, AIS, RDI, etc.) aggregating tunnel information (e.g., tunnel label, tunnel ID, etc.) of each of one or more particular affected tunnels on the corresponding common Ethernet segment. Accordingly, in step 730, the device sends each respective fault message over a selected tunnel of the one or more particular affected tunnels on the corresponding common Ethernet segment as described above, and the procedure 700 ends in step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for aggregated delivery of tunnel fault messages on common Ethernet segments in a computer network. In particular, the techniques herein reduce the time it takes for a Fault message to reach the endpoint, resulting in speed up of cutover time and reduced traffic disruption. In addition, the techniques herein reduce the amount of control traffic generated due to the failure, and are a configurable mechanism that can be enabled only on certain routers (e.g., that are transit points for a large scale setup).

As an example (and non-limiting) performance analysis of the techniques herein, let:
   $t\_T$=the transmission time for one Fault message;
   $t\_P$=the propagation time for one Fault message;
   $t\_G$=the generation time for one Fault message;
   $t\_C$=the time taken to determine common ethernet segments+populate TLV;
   N=number of MPLS-TP LSPs affected by a link failure; and
   M=number of links a Fault message would have to traverse to reach the end point.

The total time incurred without the techniques herein, in the worst case, assuming all MPLS-TP LSPs have to traverse all links will generally be:

$$t\_OLD = N*M*(t\_T + t\_P + t\_G).$$

(Note that even though the fault messages are sent directly from the point of failure to the end point, there is some processing that needs to be performed at each hop to determine which way the packet needs to be forwarded at the forwarding layer.)

With the same scenario, with the techniques herein in place, the total time incurred will generally be:

$$t\_NEW = M*(t\_T + t\_P + t\_G + t\_C).$$

Thus, it can be seen that the gains are larger if a larger number of MPLS-TP LSPs are involved. Also, with the techniques herein, since only one Fault message is generated per common ethernet segment, the total time incurred in the worst case will be when all the affected MPLS-TP LSPs use M unique ethernet segments, the same as: $t\_NEW \sim t\_OLD = N*M*(t\_T + t\_P + t\_G)$. Note also that efficient implementation can make the time $t\_C$ taken for TLV population and determination of common Ethernet segment really small such that $t\_C$ has a much smaller effect on the total time incurred.

While there have been shown and described illustrative embodiments that provide aggregated delivery of tunnel fault messages on common Ethernet segments in a computer network, it is to be understood that various other adaptations and modifications may be made within the spirit and scope of the embodiments herein. For example, the embodiments have been shown and described herein with relation to MPLS-TP-LSPs and other various protocols. However, the embodiments in their broader sense are not as limited, and may, in fact, be used with any similar type of tunnels (e.g., "FlexLSP" or Bi-directional TE), other types of path computation, etc. In addition, where one tunnel (e.g., TP-LSP) could carry multiple tunnels (hierarchical tunnels), the techniques herein may still operate based on the parent tunnel, where the parent tunnel's endpoint may branch the fault message(s) onto the child tunnels, and the processes described herein may continue accordingly.

In particular, it should be noted that the concept of a "tunnel" within MPLS-TP is not necessarily a 1-to-1 relationship with an LSP; that is, an LSP may be an instance of the MPLS-TP "tunnel" as a logical container. In other words, in MPLS-TP, a tunnel generally consists of two LSPs, working and protect (each of which in turn consists of a forward and reverse LSP), where the working and protect tunnels may take a different number of hops. According to this terminology, therefore, it is important to note that the term "tunnel" herein, when used in reference to MPLS-TP technology, actually references each single LSP individually (e.g., each of the working and protect LSPs) within the logical container.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, at a device in a computer network, one or more tunnels affected by a downstream fault in the computer network;
   determining one or more common Ethernet segments of the device used by the affected tunnels;
   generating, for each of the one or more common Ethernet segments, a respective fault message aggregating tunnel information of each of one or more particular affected tunnels on the corresponding common Ethernet segment; and
   sending each respective fault message with aggregated tunnel information over a selected tunnel of the one or more particular affected tunnels on the corresponding common Ethernet segment.

2. The method as in claim 1, wherein determining the one or more affected tunnels comprises:
   detecting a fault of an attached Ethernet segment.

3. The method as in claim 1, wherein determining the one or more affected tunnels comprises:
   receiving an incoming fault message from a downstream device, the incoming fault message aggregating tunnel information identifying the affected tunnels.

4. The method as in claim 1, wherein the tunnel information is selected from a group consisting of: a tunnel label; and a tunnel identifier.

5. The method as in claim 1, wherein the tunnels are multi-protocol label switching transport profile label switched paths (MPLS-TP-LSPs).

6. The method as in claim 1, further comprising:
   determining a number of affected tunnels; and
   aggregating the tunnel information within respective fault messages only in response to the number of affected tunnels being greater than a configured threshold.

7. The method as in claim 1, wherein the fault message is selected from a group consisting of: a link down indication (LDI); a lock report (LKR); an alarm indication signal (AIS); and a remote defect indication (RDI).

8. An apparatus, comprising:
   one or more network interfaces to communicate over Ethernet segments within a computer network;
   a processor coupled to the network interfaces and adapted to execute one or more processes; and
   a memory configured to store a process executable by the processor, the process when executed operable to:
   determine one or more tunnels affected by a downstream fault in the computer network;
   determine one or more common Ethernet segments used by the affected tunnels;
   generate, for each of the one or more common Ethernet segments, a respective fault message aggregating tunnel information of each of one or more particular affected tunnels on the corresponding common Ethernet segment; and
   send each respective fault message with aggregated tunnel information over a selected tunnel of the one or more particular affected tunnels on the corresponding common Ethernet segment.

9. The apparatus as in claim 8, wherein the process when executed to determine the one or more affected tunnels is further operable to:
   detect a fault of an attached Ethernet segment.

10. The apparatus as in claim 8, wherein the process when executed to determine the one or more affected tunnels is further operable to:
    receive an incoming fault message from a downstream device, the incoming fault message aggregating tunnel information identifying the affected tunnels.

11. The apparatus as in claim 8, wherein the tunnel information is selected from a group consisting of: a tunnel label; and a tunnel identifier.

12. The apparatus as in claim 8, wherein the tunnels are multi-protocol label switching transport profile label switched paths (MPLS-TP-LSPs).

13. The apparatus as in claim 8, wherein the process when executed is further operable to:
    determine a number of affected tunnels; and
    aggregate the tunnel information within respective fault messages only in response to the number of affected tunnels being greater than a configured threshold.

14. The apparatus as in claim 8, wherein the fault message is selected from a group consisting of: a link down indication (LDI); a lock report (LKR); an alarm indication signal (AIS); and a remote defect indication (RDI).

15. A tangible, non-transitory, computer-readable media having software encoded thereon, the software when executed by a processor operable to:
    determine, at a device in a computer network, one or more tunnels affected by a downstream fault in the computer network;
    determine one or more common Ethernet segments of the device used by the affected tunnels;
    generate, for each of the one or more common Ethernet segments, a respective fault message aggregating tunnel information of each of one or more particular affected tunnels on the corresponding common Ethernet segment; and
    send each respective fault message with aggregated tunnel information over a selected tunnel of the one or more particular affected tunnels on the corresponding common Ethernet segment.

16. The computer-readable media as in claim 15, wherein the software when executed to determine the one or more affected tunnels is further operable to:
    detect a fault of an attached Ethernet segment.

17. The computer-readable media as in claim 15, wherein the software when executed to determine the one or more affected tunnels is further operable to:
    receive an incoming fault message from a downstream device, the incoming fault message aggregating tunnel information identifying the affected tunnels.

18. The computer-readable media as in claim 15, wherein the tunnel information is selected from a group consisting of: a tunnel label; and a tunnel identifier.

19. The computer-readable media as in claim 15, wherein the tunnels are multi-protocol label switching transport profile label switched paths (MPLS-TP-LSPs).

20. The computer-readable media as in claim 15, wherein the software when executed is further operable to:
   determine a number of affected tunnels; and
   aggregate the tunnel information within respective fault messages only in response to the number of affected tunnels being greater than a configured threshold.

21. The computer-readable media as in claim 20, wherein the fault message is selected from a group consisting of: a link down indication (LDI); a lock report (LKR); an alarm indication signal (AIS); and a remote defect indication (RDI).

* * * * *